Nov. 24, 1959 C. WASMANSDORFF 2,914,668

LIMITING AMPLIFIER

Filed Nov. 20, 1953

CARLTON WASMANSDORFF
*INVENTOR.*

BY Bruce L. Birchard

HIS ATTORNEY 2,914,668
Patented Nov. 24, 1959

2,914,668

LIMITING AMPLIFIER

Carlton Wasmansdorff, Los Angeles, Calif., assignor to Hoffman Electronics Corporation, a corporation of California Application November 20, 1953, Serial No. 393,473

2 Claims. (Cl. 250—27)

This invention relates to improvements in wave-signalling apparatus, and more particularly, to such apparatus in which the effects of undesired noise signals are reduced to a minimum.

In the past many attempts have been made to develop noise suppression circuits for radio, radar, sonar and the like which would permit reproduction of desired weak intelligence-bearing signals in the presence of very large noise impulses either internally or externally generated and of either man-made or natural origin. In general, these attempts have utilized circuits providing a gain-changing type of limiting, which results in suppression or capture of desired weak signals in the presence of strong noise impulses or signals and results, further, in limiting on a non-dynamic basis; or have attempted to accomplish the entire limiting action at a small number of points in the circuit, which has resulted in the generation of numerous harmonics and other spurious signals, and less than optimum suppression of ringing in the associated tuned circuits.

Therefore, it is an object of this invention to provide improved noise suppression circuitry and techniques for wave signalling receivers.

It is a further object of this invention to provide a noise suppression circuit unusually effective in the reception of continuous-waves and frequency modulated waves despite the presence of high amplitude noise impulses.

According to the present invention, a wave signalling receiver for use with radio, radar, sonar and the like is constructed with, preferably, all its stages free of bias generating elements and with the limiting effected in a plurality of networks containing translating elements, the operating potentials for each such element being chosen to reduce its dynamic operating range and to assure the commencement of its limiting action at a successively lower point on an incoming signal as the signal proceeds from the early networks of the receiver to the later networks thereof. This progressive, instantaneous dynamic type of limiting in which "de-Qing" of the tuned circuits by the translating elements in the presence of large signals is an important contributing factor, has proven phenomenally effective in permitting the reception of desired intelligence-bearing signals in the presence of noise impulses of extremely high amplitude.

The features of the present invention which are believed to be novel are set forth with particularity in the appended claims. The present invention itself, both as to its organization and manner of operation, together with further objects and advantages thereof, may best be understood by reference to the following description, taken in connection with the accompanying drawings, in which:

Figure 1:
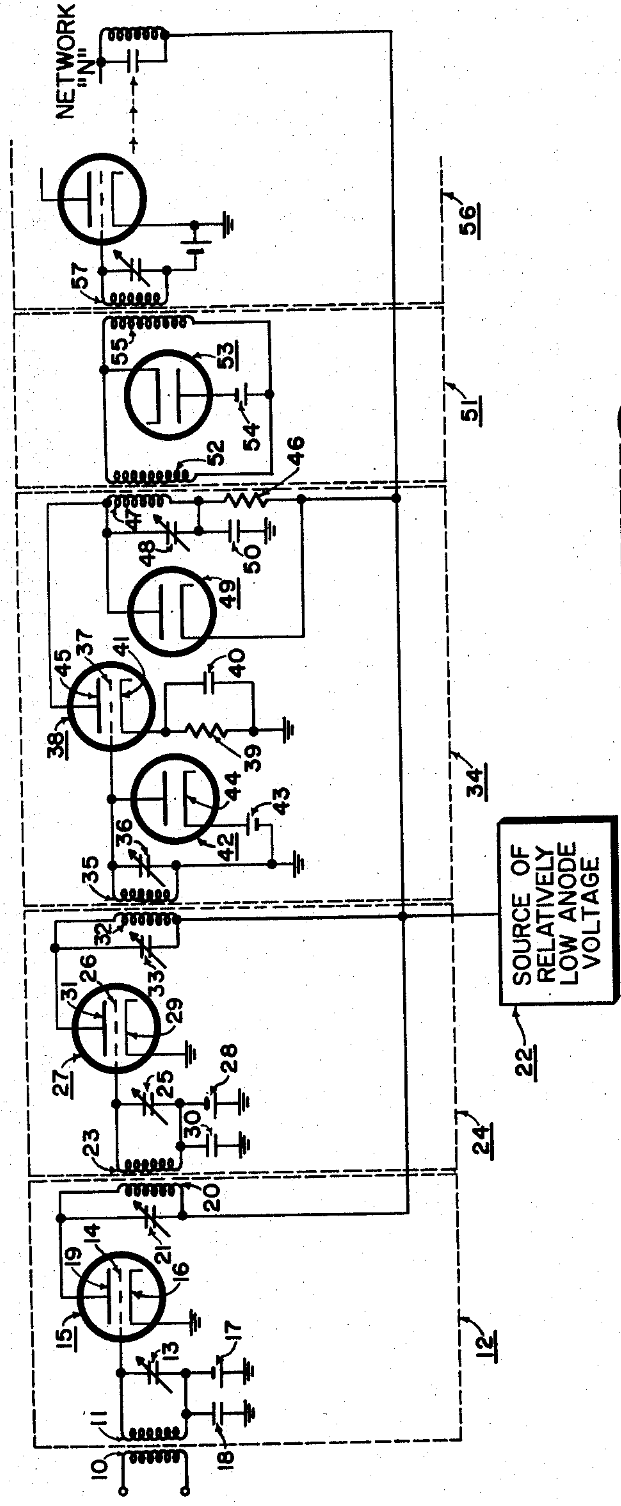
Figure 1 is a simplified circuit diagram of a wave signalling circuit incorporating the present invention.

In Figure 1, input signals are impressed from primary 10 onto secondary 11 in network 12. Secondary 11 may be tuned to the signal frequency by capacitor 13. Secondary 11 is connected to grid 14 of vacuum tube 15 and, for high frequency alternating currents, is also coupled to cathode 16. A source of fixed grid bias 17 may be provided for reasons hereinafter described. Capacitor 18 by-passes high frequency currents around bias source 17. Operating current for anode 19 is supplied through inductance 20, which may be tuned to the signal frequency by capacitor 21, from a source of relatively low anode voltage, 22. Output signals from network 12 are coupled to input inductance 23 in network 24. Input inductance 23 may be tuned to signal frequency by capacitor 25. Appropriate bias potential for grid 26 of vacuum tube 27 may be provided from a source of fixed bias potential 28, since inductance 23 is connected effectively between grid 26 and cathode 29 of vacuum tube 27. Capacitor 30 may be provided to by-pass high-frequency currents around bias source 28. Operating current for anode 31 is supplied through output inductance 32 from the source of relatively low anode voltage, 22. Output inductance 32 may be tuned to the signal frequency by capacitor 33.

Output signals from network 24 may be coupled to network 34 through input inductance 35 which may be tuned to signal frequency by capacitor 36. Inductance 35 is connected between grid 37 of vacuum tube 38 and ground potential. A biasing network comprising resistor 39 and capacitor 40 may be connected between cathode 41 and ground potential. A diode 42, which may be of the vacuum tube or semi-conductor type is connected between grid 37 and ground potential through an appropriate source of delay bias potential 43. It should be noted that biasing potential for diode 42 may be obtained from cathode 41 by connection of cathode 44 directly to cathode 41 instead of to the source of delay bias potential 43.

Operating current for anode 45 of vacuum tube 38 may be supplied from source 22 through dropping resistor 46, which is of small magnitude, and output inductance 47. Capacitor 48 may be provided to tune inductance 47 to the signal frequency. Diode 49 is connected effectively in shunt relationship with inductance 47, resistor 46 being interposed to provide a small delay biasing potential for diode 49. Capacitor 50 is provided to by-pass high-frequency currents around resistor 46.

Output signals from network 34 may be coupled to network 51 through inductance 52 which may be shunted by diode 53 of either the vacuum tube or semi-conductor type. A source of fixed delay bias 54 may be provided to set the operating level of diode 53. It should be noted that network 51 is passive. Output signals may be taken from network 51 through inductance 55 and coupled to network 56 through input inductance 57. Network 56 and subsequent networks, according to this invention, may be made to provide functions of amplifying or functions other than amplifying, for example, detection or frequency conversion, but these networks also should meet certain requisites set forth hereinafter in order to provide optimum noise suppression.

The first requirement is that input circuit resistances and capacitances be minimized so that, on high positive noise peaks, a minimum amount of direct current bias is produced and the time for recovery of the input circuits from the effects of a noise pulse is minimized, for such bias may completely cut off desired intelligence-bearing signals while permitting noise impulses to pass through the translating networks. Further, such cut-off and recovery itself produces a spurious signal which masks the desired signal. This spurious signal, and others like it, are amplified and multiplied in subsequent translating networks and are important contributing factors to the noise problem.

The second requirement is that the dynamic range of the network be reduced by properly setting the operating potential of any translating element in the network. Where that translating element is a vacuum tube having at least anode, cathode and control electrodes, this setting involves reduction of the anode voltage to a magnitude materially less than its normal operating value. Several desirable effects occur by reason of this reduction in anode operating potential. First, anode current saturation occurs at relatively low grid input signal voltage levels, and, second, the signal voltage level required to drive the grid into a conductive state is reduced for a given value of cathode biasing resistor. The result of this latter effect is damping or "de-Qing" of any associated tuned circuits when input signals exceed a predetermined level.

As an example of the reduction in anode operating potential, taught by this invention, with conventional receiving tubes the normal anode operating voltage is in the order of 180 volts but according to this invention that potential may be reduced, purely by way of example, to approximately 20 to 50 volts.

The network component values, including the potential of the fixed bias sources, if any, are chosen so that the desired intelligence bearing signals of minimum input amplitude will just reach the limiting level of the final translating element in the final network relied upon for limiting.

Figure 2:
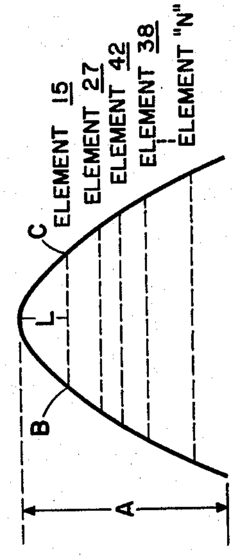
Figure 2 is a graphic representation of certain phases of the operation of the circuit of Figure 1.

Further, the operating potentials and component values for successively earlier translating elements are adjusted so that each of those elements reaches a limiting condition at a progressively higher level on an input signal. This condition is represented graphically in Figure 2. Assume the input signal has an amplitude A exceeding the limiting level of the first translating element (in this case vacuum tube 15), by an amount L. The signal will be reduced in amplitude by the amount L, which is a relatively small percentage of the total signal amplitude. The reactive components, such as inductance 20 and capacitance 21 and the gradual transition from amplifying to limiting referred to earlier herein will tend to round the sharp transitions at B and C with the result that the output signal from the network including vacuum tube 15 will closely resemble in form the original input signal. This signal when impressed on the next limiting element, 27, will be reduced in amplitude once more by a small amount. Once again the wave shape will be retained through the limiting network. This action is repeated with limiting at progressively lower points on the input wave as it progresses toward limiting element "N." Further, the dynamic limiting taught by this invention involves, in translating elements possessing amplifying properties, a gradual, rather than abrupt, transition from an amplifying condition to a limiting condition. By reason of this gradual, progressively lower limiting action a number of very desirable and unusual effects are realized. First, the wave shape of the input signal is retained to an unusual degree, and the performance of the overall circuit approaches that of a signal compressor.

This reduction in signal distortion by progressive limiting leads to the second desirable effect, namely, a minimum generation of harmonics. Reduction in harmonics results in a reduction in cross-modulation products, particularly between noise and harmonics, and reduces the total noise materially.

A further desirable result arises from progressive limiting. The limiting according to this invention occurs towards the top of the signal impressed on any particular limiting element. By reason of the rounding effects introduced by reactive components preceding the limiting element, the limiting will, in general, occur in regions of the signal having a reasonably low rate of change, and cross-modulation with noise signals will be minimized.

Additionally, progressive limiting increases the effects of "de-Qing," which occurs in each tuned circuit associated with a limiting element. This damping or "de-Qing" not only reduces the amplitude of noise impulses but minimizes the ringing in the tuned circuits, hence, minimizing the generation of spurious signals and shortening the period in which desired signals are completely suppressed by noise impulse trains, either through anode current saturation on positive noise peaks or grid cut-off on negative noise peaks.

Where the networks do not include amplifying elements, but, instead, contain diodes of either the vacuum tube or semiconductor type connected effectively in shunt with tuned circuits, bias is applied to such elements to assure limiting and "de-Qing" in accordance with the foregoing technique of progressive limiting. Once, again, any bias generating elements are removed to the extent possible in view of the function of a particular stage.

A still further teaching of this invention is that the limiting action be commenced in the earliest possible stage of the receiver. For example, in radio receivers the radio frequency and other stages preceding the intermediate frequency amplifiers are relatively less selective (hence, have lower Q's), than the intermediate frequency amplifier stages. Thus, noise pulses produce ringing for a relatively smaller period of time than they do if permitted to pass, unlimited, to the high-Q, intermediate frequency stages. Ringing effectively stretches the noise pulses and extends the period when they swamp desired intelligence-bearing signals. By limiting the noise pulses prior to the intermediate frequency amplifiers a great improvement in the readability of desired signals through noise impulses is obtained.

It should be noted that by minimizing the primary transients directly associated with the noise impulses, secondary transients which are produced as by-products of the noise impulses as a result of a lack of regulation in the power supply circuits, and from other sources, are reduced to a minimum. These secondary transients appear as noise in the circuits and their elimination or reduction is an aid to the reception of desired signals.

Apparatus constructed according to this invention has exhibited the ability to reproduce desired intelligence-bearing signals having an input level of 10 microvolts when there are simultaneously present at the input, noise pulses having amplitudes in the order of 100 volts, or more.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A wave signal receiver for discriminating sharply against impulse-type noise accompanying the signals to be received, comprising an input amplifying stage and a plurality of cascade-connected succeeding amplifying stages, tuned input and output stage-coupling circuits connected between the successive amplifying stages, each of said stages including an amplifier tube containing at least an anode, a cathode and a control grid, a source of anode supply voltage connected from a point of ground or reference potential to the anode of each stage through its output coupling circuit, the magnitude of said anode supply voltage source being a minor fraction of the rated anode supply voltages and said amplifier tubes for maximum amplification, whereby to produce anode-current saturation limiting in each tube at a relatively low value of the corresponding input signal level; at least the initial stages including said input stage and certain of said succeeding stages each having a fixed source of grid bias potential substantially devoid of grid circuit resistance, connected between said point of ground or reference potential and the control grid of the respective stage, the magnitudes of such bias potentials being graded over the successive stages to values that will produce progressive limiting, from the initial stage onward, at progressively lower percentage levels of the input signal strength to each successive stage.

2. A wave signal receiver in accordance with claim 1, including fixed biased diode elements connected in shunt with at least certain of said stage-coupling circuits, the biasing voltages for said diode elements being selected to minimize ringing in the shunted circuits due to impulses of the order of magnitude passed to the respective circuits through the said progressive limiting actions.

References Cited in the file of this patent

UNITED STATES PATENTS

| | | |
|---|---|---|
| 2,285,044 | Morris | June 2, 1942 |
| 2,289,840 | Herz | July 14, 1942 |
| 2,450,443 | Rich | Oct. 5, 1948 |
| 2,543,068 | Seddon | Feb. 27, 1951 |
| 2,544,226 | Herold | Mar. 6, 1951 |

FOREIGN PATENTS

| | | |
|---|---|---|
| 952,229 | France | Apr. 25, 1949 |